UNITED STATES PATENT OFFICE.

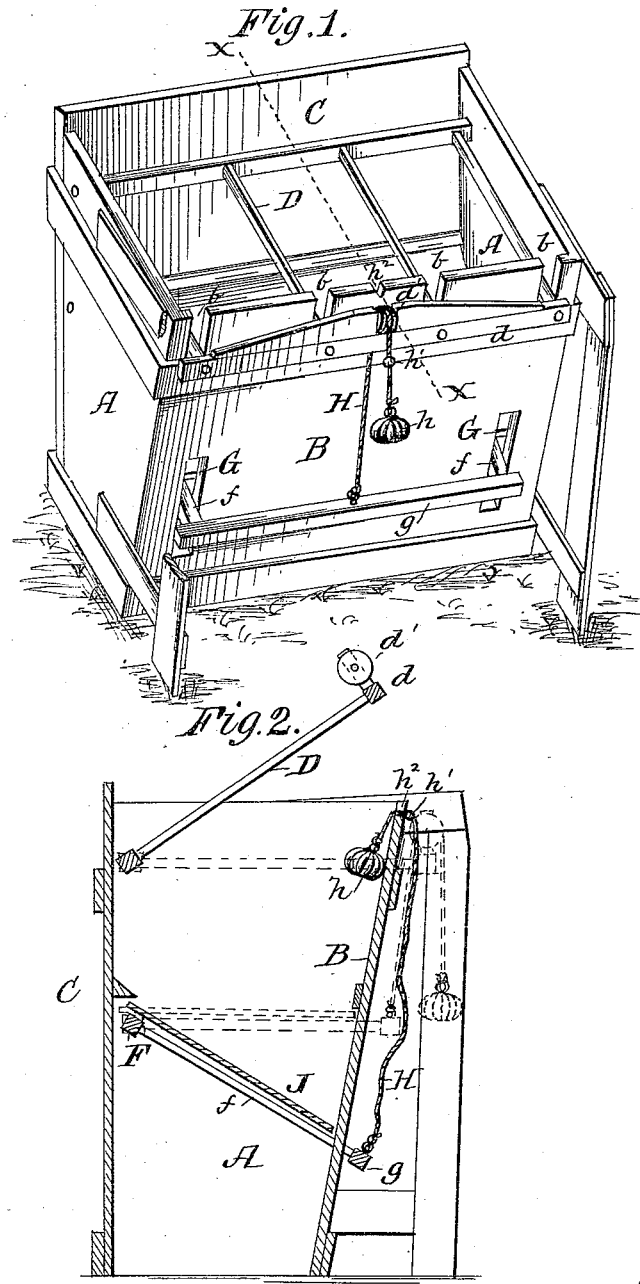

JOHN FRANKLIN FITZGERALD, OF TRENTON, TENNESSEE.

FEED-RACK.

SPECIFICATION forming part of Letters Patent No. 444,577, dated January 13, 1891.

Application filed April 11, 1890. Serial No. 347,459. (No model.)

*To all whom it may concern:*

Be it known that I, JOHN FRANKLIN FITZGERALD, a citizen of the United States, residing at Trenton, in the county of Gibson and State of Tennessee, have invented certain new and useful Improvements in Horse-Racks; and I do hereby declare the following to be a full, clear, and exact description of the invention, such as will enable others skilled in the art to which it appertains to make and use the same.

This invention relates to troughs for feeding stock, and aims to produce a saving of feed and prevent the animal from scattering the same on the ground.

The improvement consists of the novel construction and the peculiar combination and arrangement of the parts, which will be hereinafter more fully described and claimed, and which are shown in the annexed drawings, in which—

Figure 1 is a perspective view, parts being broken away, of a trough embodying my invention. Fig. 2 is a cross-section on the line $x\ x$ of Fig. 1, showing the operation by dotted lines.

The trough comprises the sides A A, the back C, and the front B.

D is the slat-frame, which is placed over the top of the trough and through which the animal reaches the feed. This frame is movable to permit access to the trough, and that it may not be lost or misplaced is hinged or pivotally connected at its rear end with the trough, the front end being free to be lifted. The upper edge of the front B of the trough is provided with notches $b$, which receive the slats of the frame, said slats projecting and being connected by the bar $d$. The front end of the slat-frame is weighted to hold it down. The bottom F of the trough is movable, being hinged or otherwise pivotally supported at its inner end, leaving the outer end free to rise and fall as required. The arms $f$ of the bottom project through slots G in the front B of the trough and are connected by the bar $g$, to which the weighted rope H is attached. This rope passes up and over a guide-pulley $d'$ on the bar $d$ and has weight $h$ on its other end.

By this construction it will be seen that weight $h$ serves in a dual capacity to hold the slat-frame D down on the feed and elevate the outer end of the bottom as the feed is eaten. The bottom F may be open or solid, the latter being preferable, as it retains loose grain, such as the flowers of clover-hay. The front B inclines from the perpendicular to preserve a nearly close joint between it and the edge of the bottom. The board J, which comprises the bottom proper, is placed loosely on the frame, of which the arms $f$ are a part, so as to gravitate against and insure a close joint between it and the front B.

In practice the weight $h$ is thrown inside the trough being supported by the stop $h'$ on the rope engaging with the notch $h^2$ in the top edge of the front B. The bottom, being released from the influence of the weight, falls until arms $f$ reach the bottom of the slots G, and the slat-frame being released is turned up. Hay or similar feed is placed in the trough and the frame D turned down. The weight $h$ is now thrown forward, the rope passing over the guide-pulley $d'$. As the feed is removed, the bottom is lifted up until it is within easy reach, when the arms $f$ will engage with the top ends of the slots G.

Having thus described my invention, what I claim, and desire to secure by Letters Patent, is—

The hereinbefore-specified trough, having notch $h^2$ in its upper edge and having the slots G G, the slot-frame D, pivoted at its rear end to the trough and having the pulley $d'$ at its front end, the bottom $f$, pivoted at its rear end and having portions projected through the slots G G, and the cord H, connected with the front end of the bottom $f$ and passing over the said pulley $d'$, and having weight $h$ at its upper end, and the knot $h'$, substantially as described, for the purpose specified.

In testimony whereof I affix my signature in presence of two witnesses.

JOHN FRANKLIN FITZGERALD.

Witnesses:
J. S. PRANSON,
WM. GAY.